Oct. 15, 1935.  J. R. WALSH  2,017,111
CONCENTRATOR
Filed Nov. 4, 1932
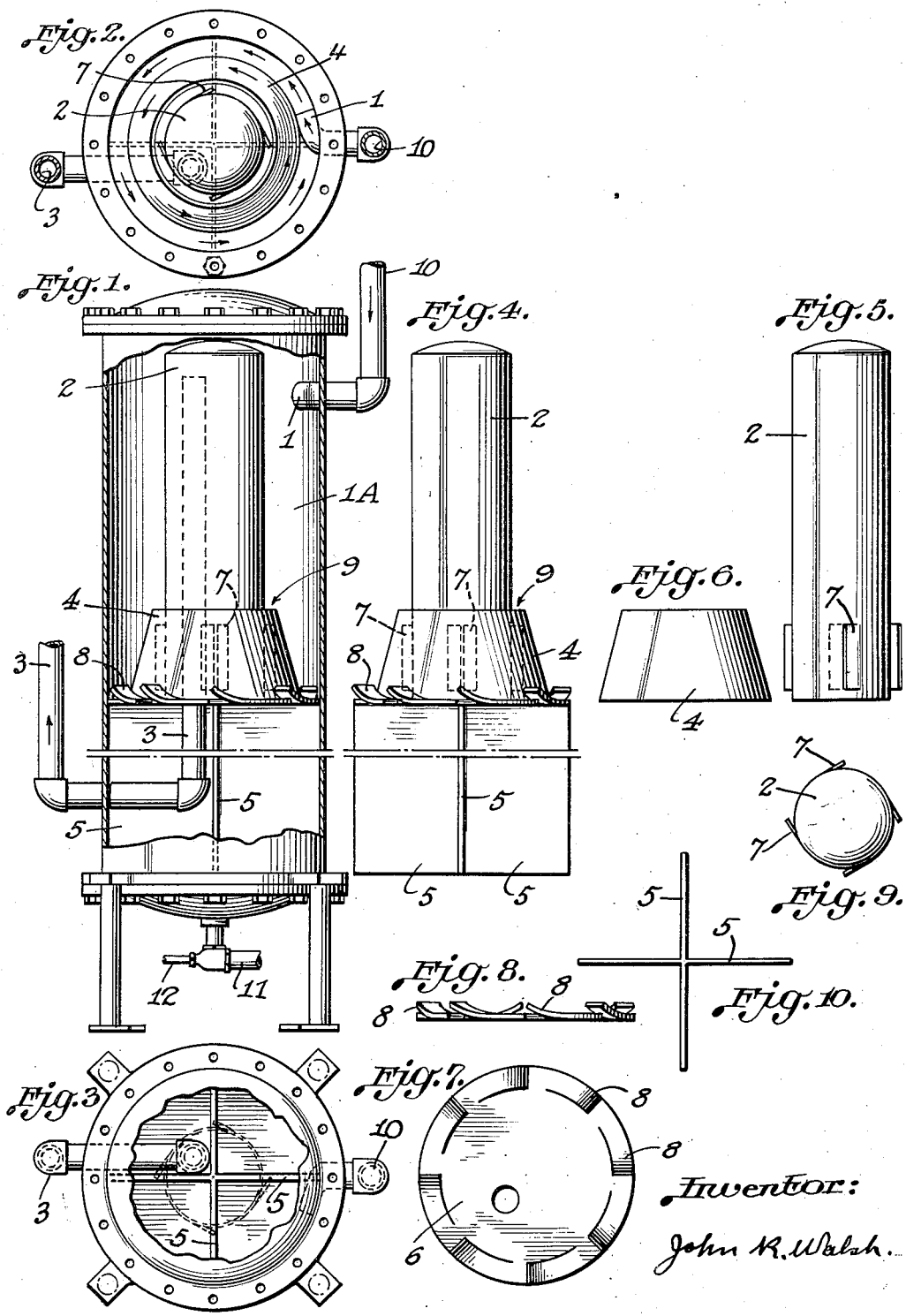
Inventor:
John R. Walsh.

Patented Oct. 15, 1935

2,017,111

UNITED STATES PATENT OFFICE 2,017,111

CONCENTRATOR

John R. Walsh, Peoria, Ill.

Application November 4, 1932, Serial No. 641,217

3 Claims. (Cl. 210—57)

This invention relates to a concentrator for a steam boiler, and has for its purpose, to keep the boiler water clean and free from sludge and other soluble matter. As all the water in all parts of the boiler carries sludge and suspended matter, it is necessary to find where it accumulates the most, and from that point the water is taken from the boiler, by either forced or induced circulation, preferably induced, as the feed water can be used to increase or diminish the speed of the circulation. The incoming flow is baffled so as to direct the flow around the shell, causing the water to revolve rapidly in outer chamber, the centrifugal force holding the ingredience to the outer shell of the chamber, until it reaches the louvers at the lower edge of the cone baffle, which are pointed up against the circular current, and washing the ingredience through the louvers to the settling chambers. The settling chambers are cross baffled to prevent the agitation of the water and allow the sediment to settle to the base, where it is taken care of by a continuous or intermediate blow-off. The clear water in its revolving motion works its way to the center next to the clear water chamber, where it passes down at the top inside of the cone baffle, which acts as a separator of the clean water and sludge, and then up to the return pipe to the boiler which is taken from the top of the clear water chamber. Around the base of the clear water chamber, inside of the cone are louvers opened against the circular flow of the water which allows free passage into the clear water chamber.

From the foregoing description it will be understood that my object is to remove all scale forming material from the boiler water, and return the clean water to the boiler.

Having described the workings of my concentrator and the functions it is intended to perform, I will proceed to describe it in detail, referring to the accompanying drawing.

Fig. 1 is a vertical set up of entire machine, showing complete outlines of entire equipment. Fig. 2 shows a plan view with top head removed, looking down into the shell. Fig. 3 shows a plan view with lower head removed, looking up into the shell. Fig. 4 shows the entire inner sections removed from the shell. Fig. 5 shows the clear water chamber with its louvers at the base. Fig. 6 shows the separating cone. Fig. 7 shows plan of louvered edge plate, and seal between clear water chamber, the base of cone, and settling chambers. Fig. 8 shows the edge of the louvered plate with the louvers projecting upwards. Fig. 9 shows a plan view of the clear liquid chamber with its (louvers) or extended openings. Fig. 10 shows a plan view of the cross sectional baffles and support.

Numeral 1 shows the baffled inlet to flatten the incoming stream against the outer shell, and cause a circular current in the outer chamber 1—A, so that the centrifugal force will hold the sludge in the outer shell until it reaches the louvers at the base of the separating cone 4 where the circular current washes it through the louvers 8 into the settling chambers. In the settling chambers is a cross baffle 5 which prevents the agitation of the water therein, and allows the sludge to settle to the base, where it can be extracted by the blow-off. Baffle 5 is centered over the blow-off outlet to allow the withdrawal of the sludge from all compartments. The clear water will work its way to the center next to the shell of the clear water chamber 2 until it reaches the top of separating cone 4, where it passes in at the opening 9 then through the louvers 7 near the base of the clear water chamber, which is shielded by the separating cone 4. The clear water then rises to the top of the clear water chamber and discharged into return line 3 to the boiler.

Fig. 2 shows a plan view with head removed looking down into the shell. Numeral 1 indicates a baffle to cause the incoming water to flow in a circular path around the shell in the outer chamber. 6 designates the louvered edge plate at the base of the cone, 8 the louvers, 9 the opening at the top of the separating cone, 4 the separating cone, and 2 the shell of the clear water chamber. Fig. 3 looking up shows the cross baffles 5 and the bottom of the louver plate which seals the base of the separating cone 4 and the clear water of chamber 2 from the settling chambers. 8 indicates the louvered edge of the plate 6. Fig. 4 shows the entire inner section removed. The cross baffle 5, which rests on the lower head acts as a foundation for the upper sections. The louver plate 6 which fits closely within the shell, and covers the entire settling chambers is welded to the separating cone 4 at its base just inside of the louvers. Fig. 5 shows the clear water chamber 2 separated from separating cone, and shows louvers 7 in the lower section. Fig. 6 illustrates the separating cone with the louvered edged plate attached. Fig. 7 illustrates a plan of louvered plate 6.

What I claim is:

1. In a device of the character described, a vertically elongated casing, an inlet pipe in the upper portion of said casing, a baffle within the inner portion of said casing, for directing liquid flowing through said inlet pipe tangentially to the casing, vertically extending cross baffles resting on the lower end of said casing and extending a substantial distance upward within said casing, a plate extending transversely within said casing and supported on the upper end of said cross baffles, louvers in the peripheral portion of said plate and extending against the direction of the flow of said tangentially directed liquid, a cone supported on said plate having its base located within the area defined by said louvers, a cylindrical shell extending upward through said cone to the top of said casing with its lower end resting on said plate, vertically extended openings in the lower portion of said cylindrical shell, an outlet for clarified liquid in the lower portion of said casing and extending upward through said plate and cone to a point within the upper portion of said shell, and an outlet for sludge in the bottom of said casing.

2. In a device of the character described, a vertically elongated casing, an inlet pipe in the upper portion of said casing, a baffle within the inner portion of said casing, for directing liquid flowing through said inlet pipe tangentially to the casing, a cylindrical shell in the upper portion of said casing, vertically extended openings in lower portion of said cylindrical shell, vertically extended cross baffle resting on lower end of said casing, a plate provided with louvers in the peripheral portion extending transversely within said casing and sealing lower end of said cylindrical shell, a cone supported on said plate having its base located within the area defined by said louvers, and its top extending to a point above the vertically extended openings, in the lower portion of the said cylindrical shell, an outlet for clarified liquid in the lower portion of said casing, and extending upward through said plate to a point within the upper portion of said cylindrical shell.

3. In a device of the character described, a vertically elongated casing, an inlet pipe in the upper portion of said casing, a baffle within the inner portion of said casing, for directing liquid flowing through said inlet pipe tangentially to the casing, a cylindrical shell in the upper portion of said casing, vertically extended openings in lower portion of said cylindrical shell, vertically extended cross baffle resting on lower end of said casing, a plate provided with louvers in the peripheral portion extending transversely within said casing, and sealing lower end of said cylindrical shell, a cone supported on said plate having its base located within the area defined by said louvers, and its top extending to a point above the vertically extending openings in the lower portion of the said cylindrical shell, an outlet for sludge in the bottom of said casing.

JOHN R. WALSH.